June 25, 1929.  C. C. BAKER  1,718,211
SWEET POTATO CRISPING PROCESS
Filed Oct. 4, 1927  9 Sheets-Sheet 1
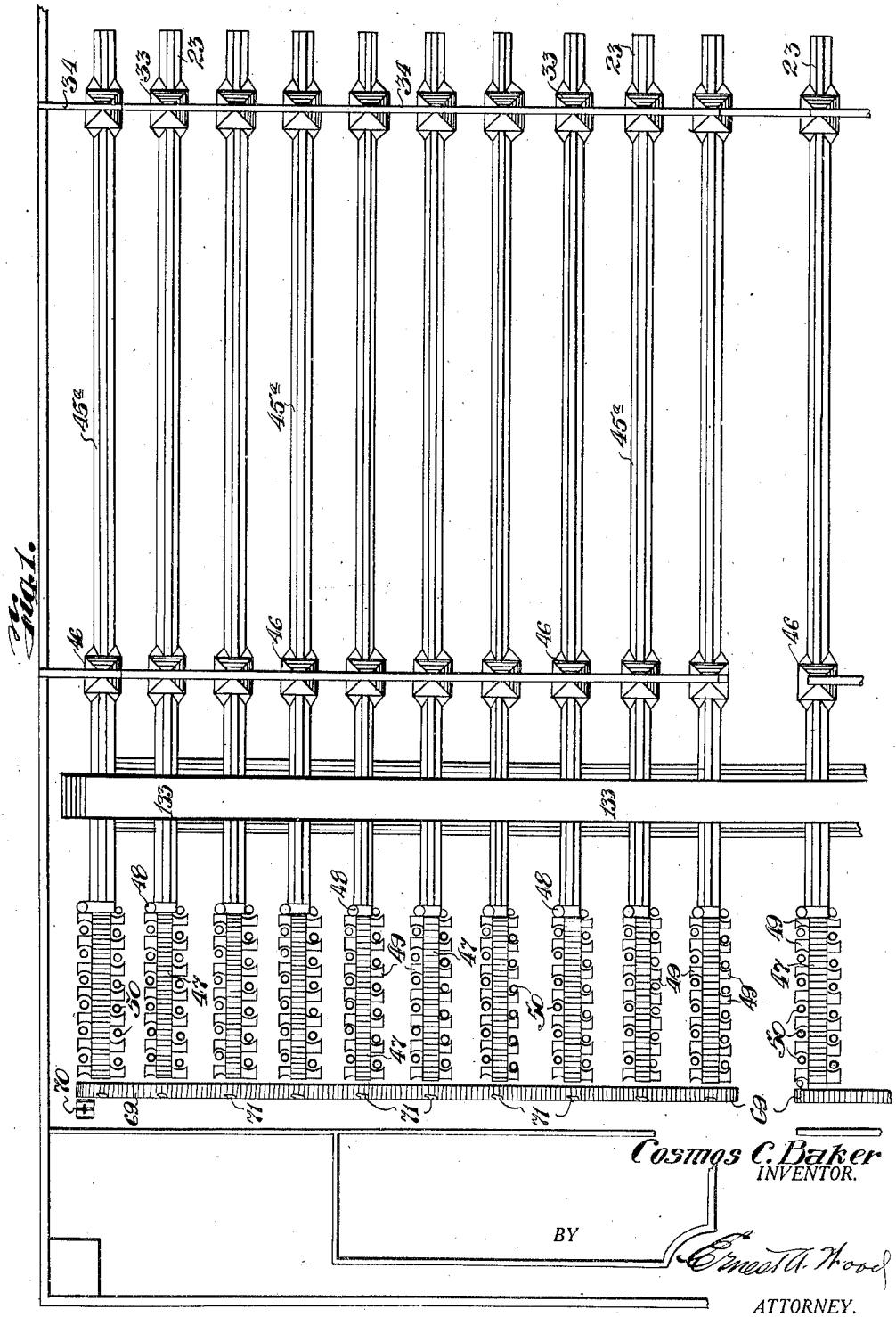
Cosmos C. Baker
INVENTOR.
BY
ATTORNEY.

June 25, 1929.  C. C. BAKER  1,718,211
SWEET POTATO CRISPING PROCESS
Filed Oct. 4, 1927  9 Sheets-Sheet 2
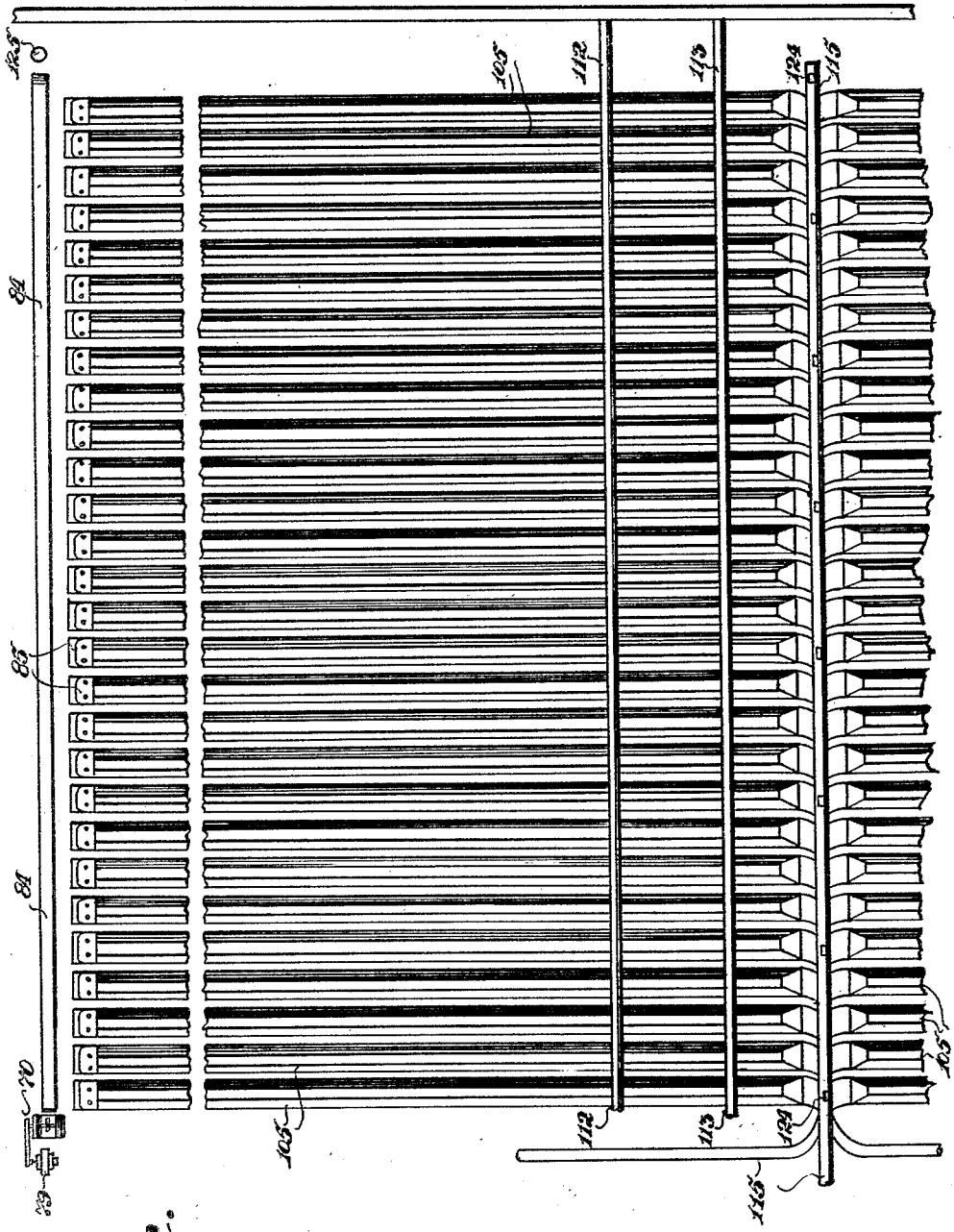
Cosmos C. Baker
INVENTOR.
BY
ATTORNEY.

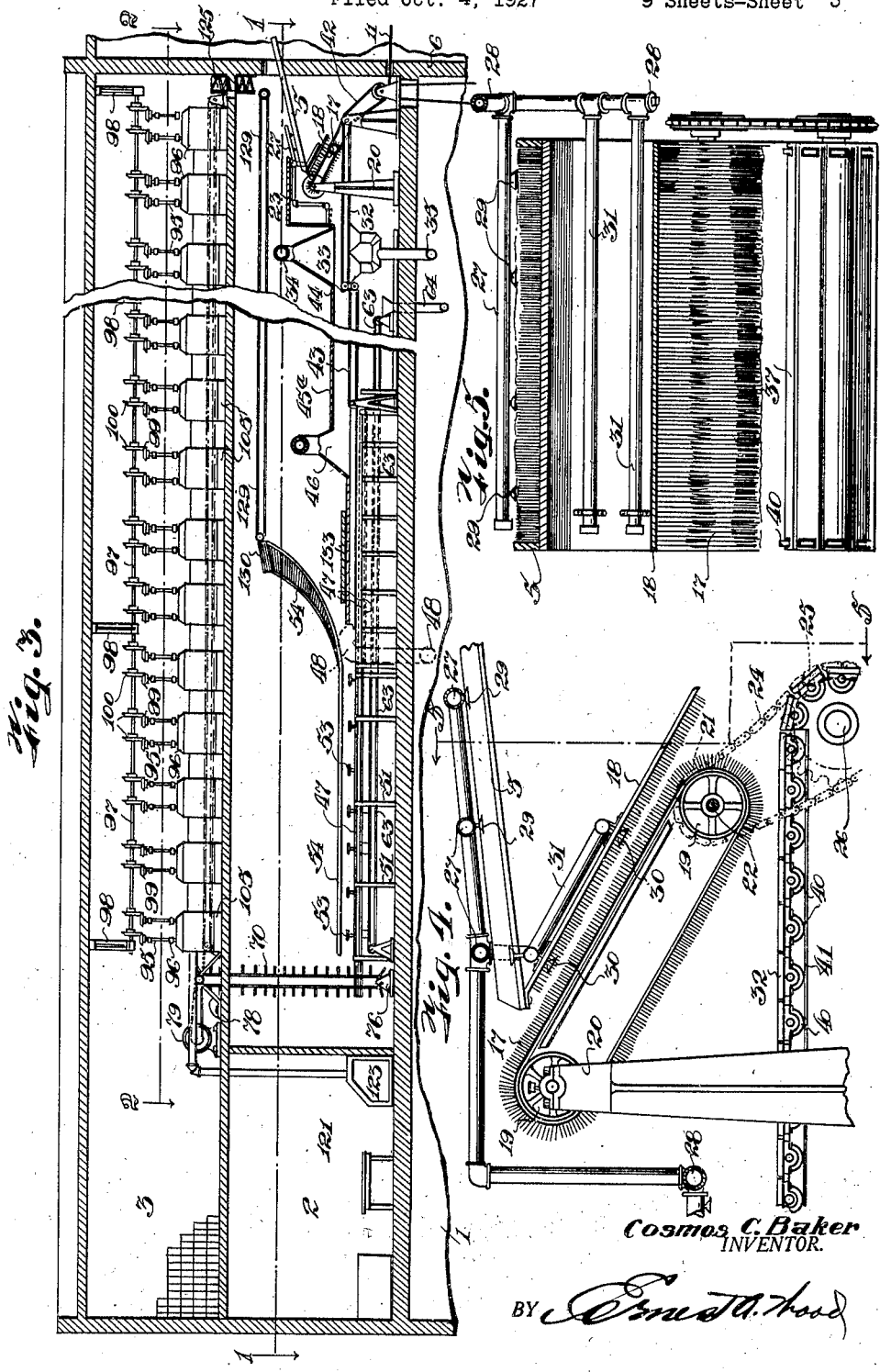

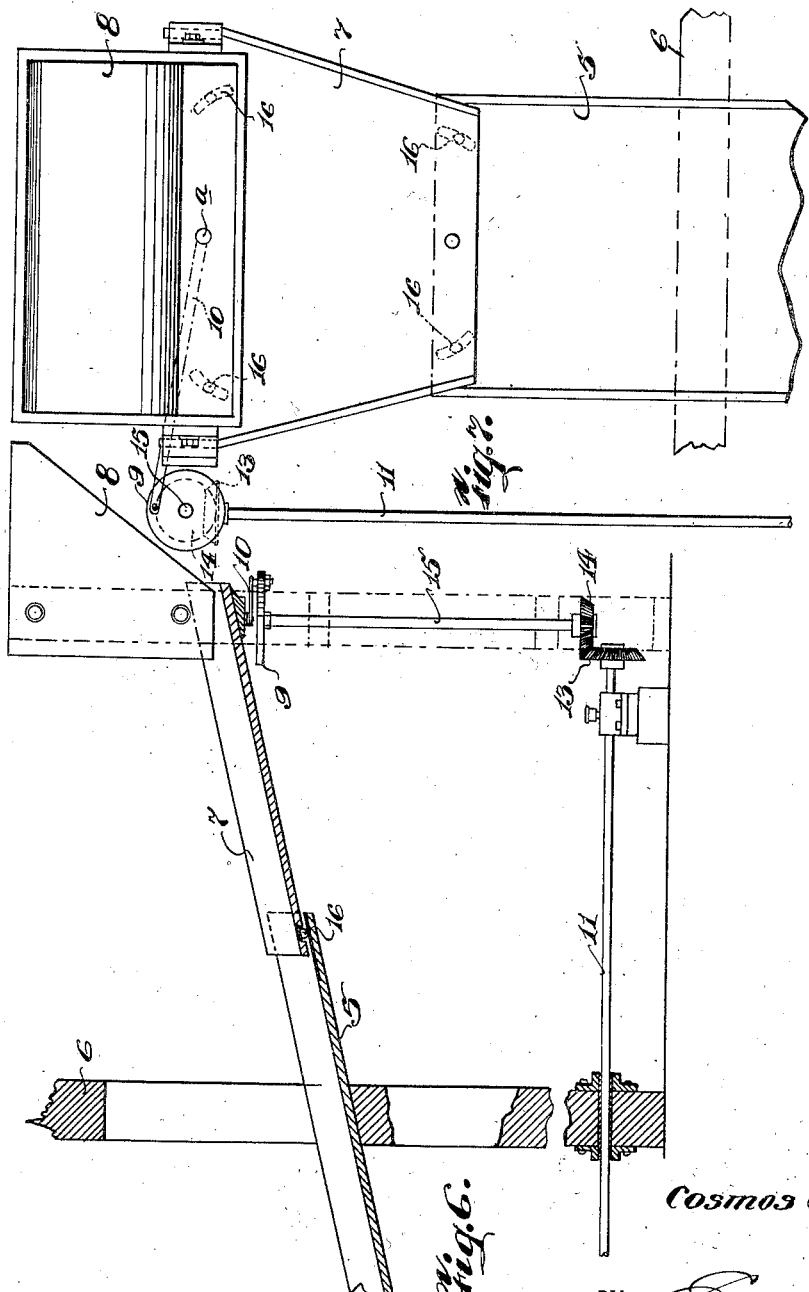

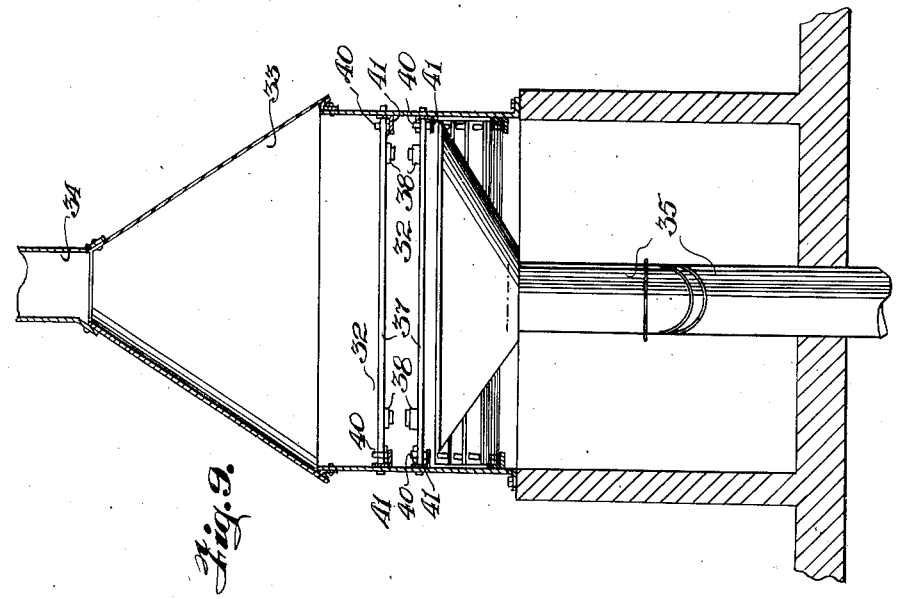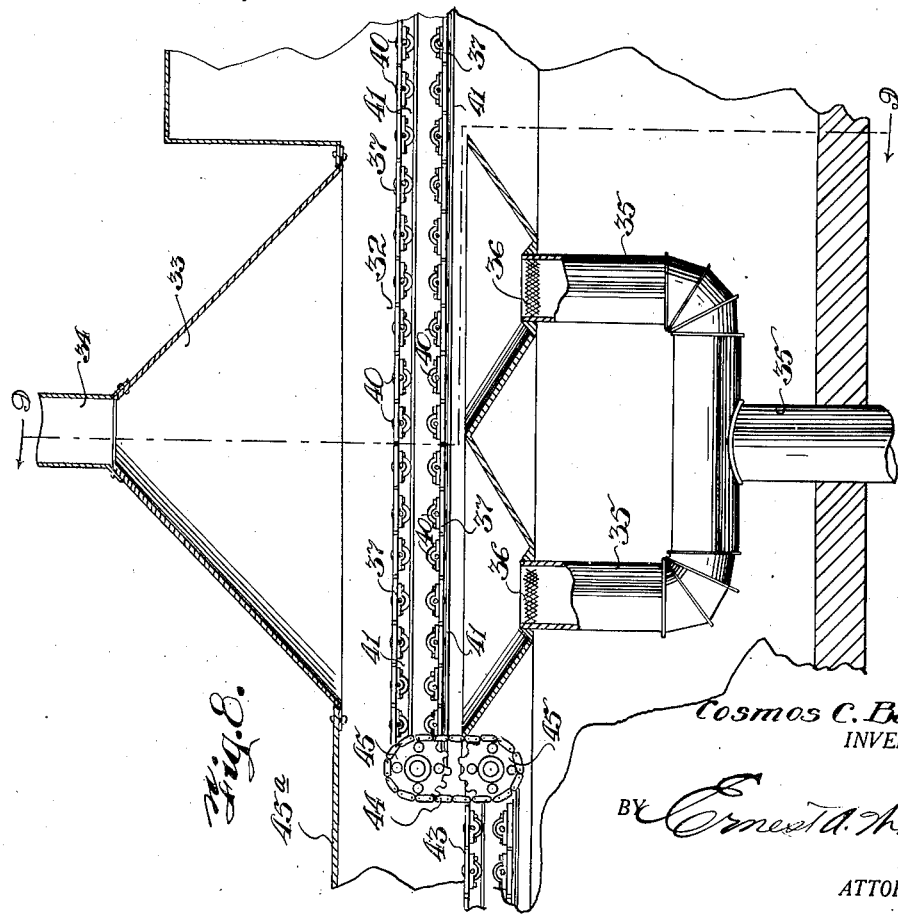

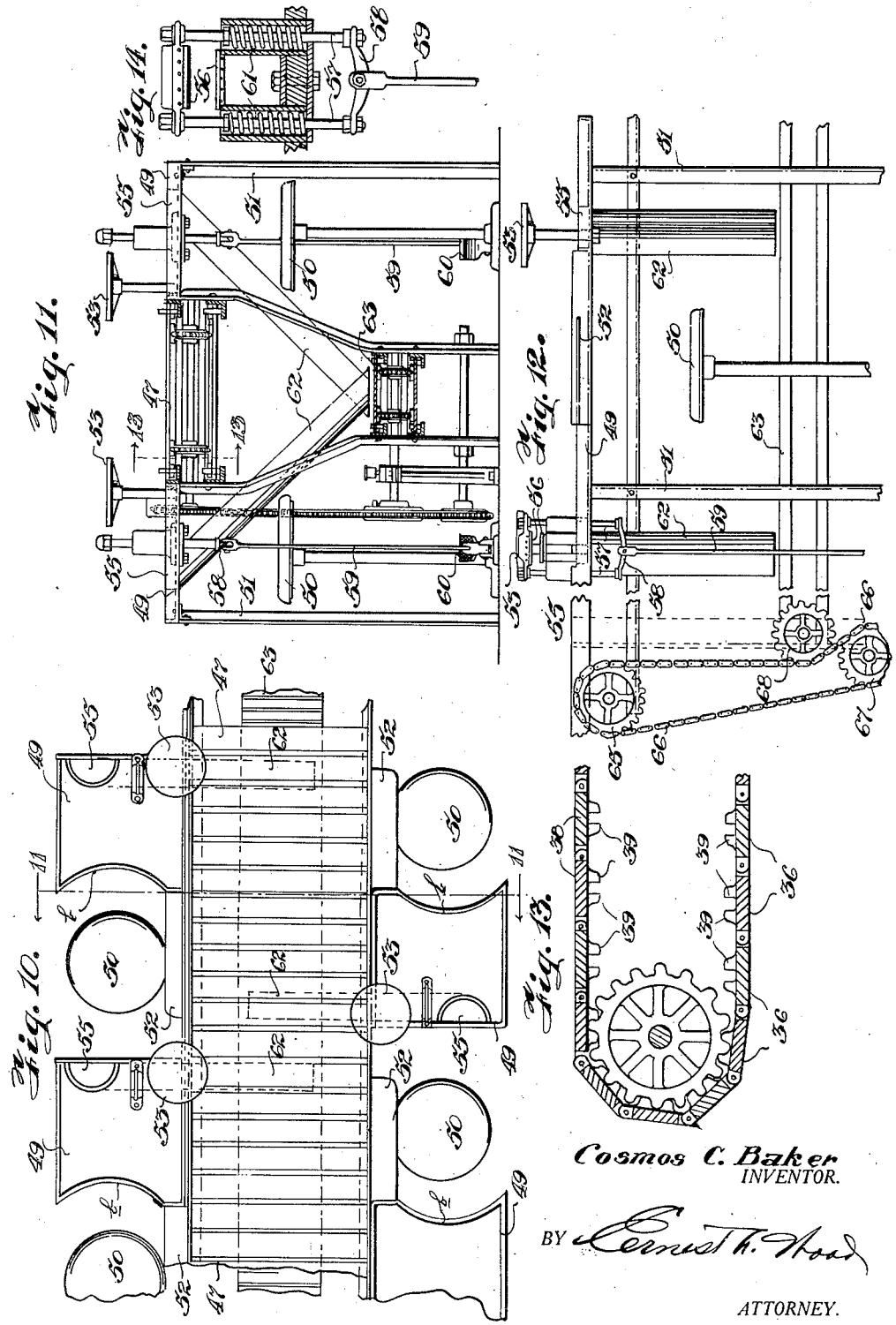

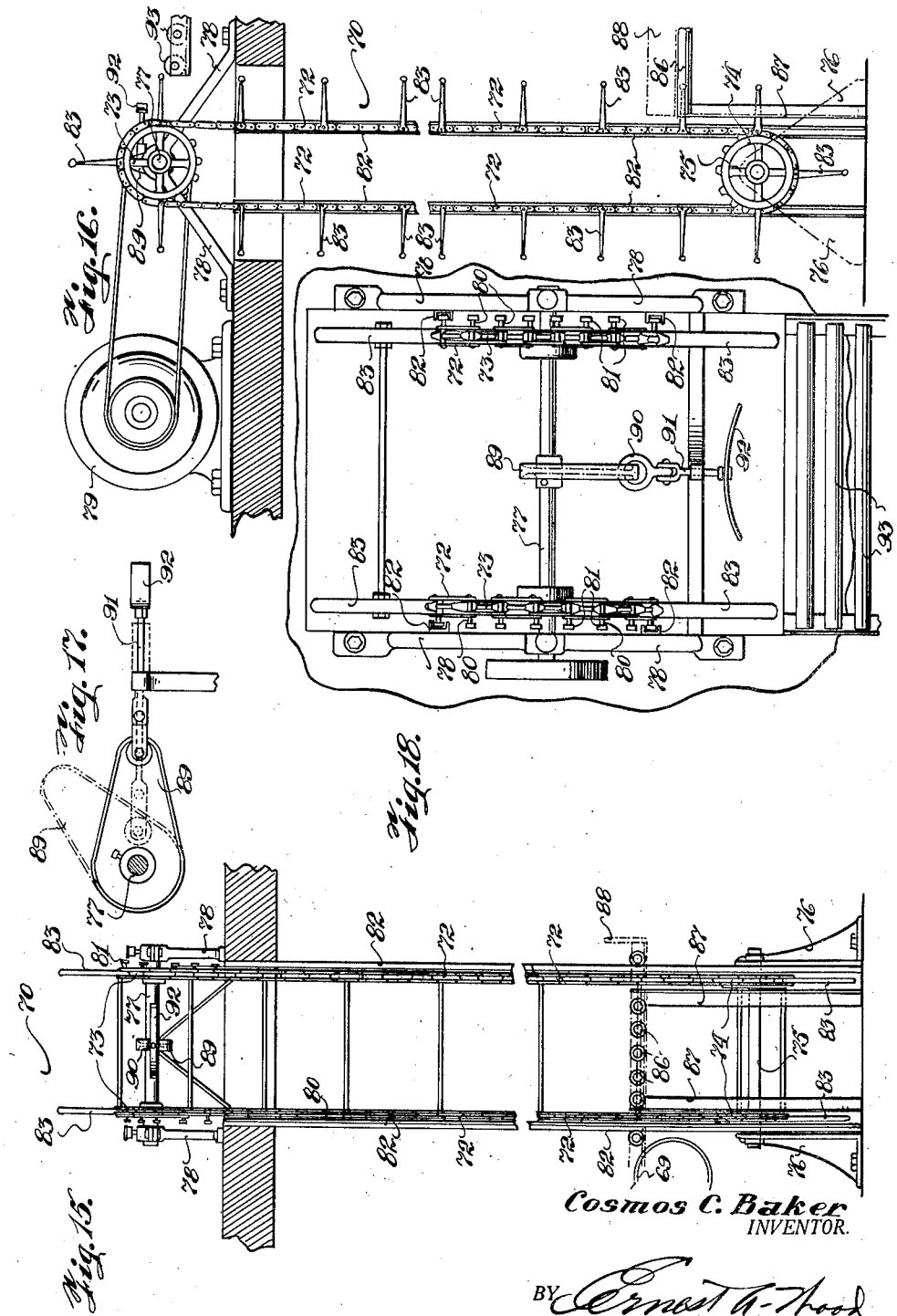

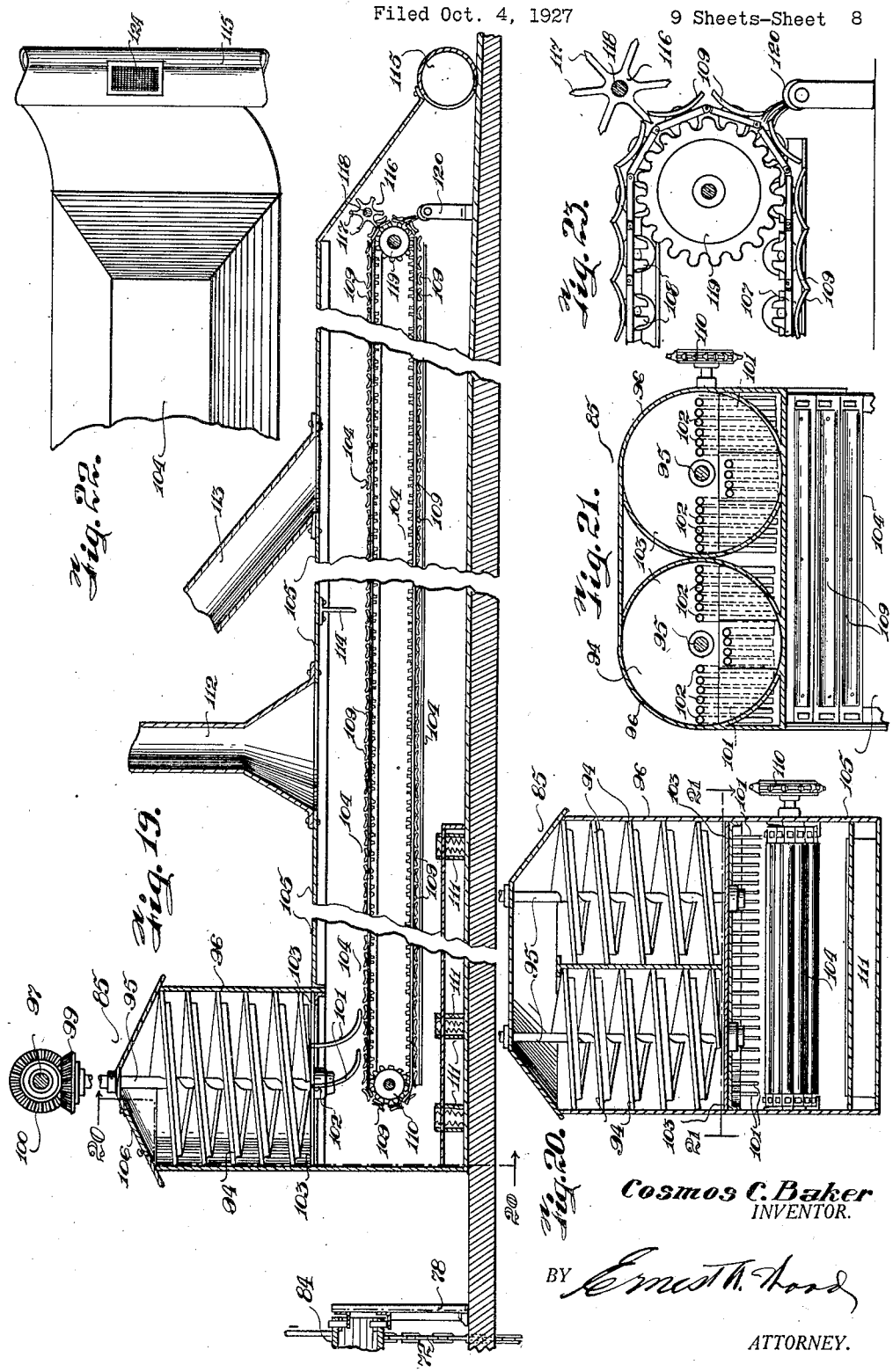

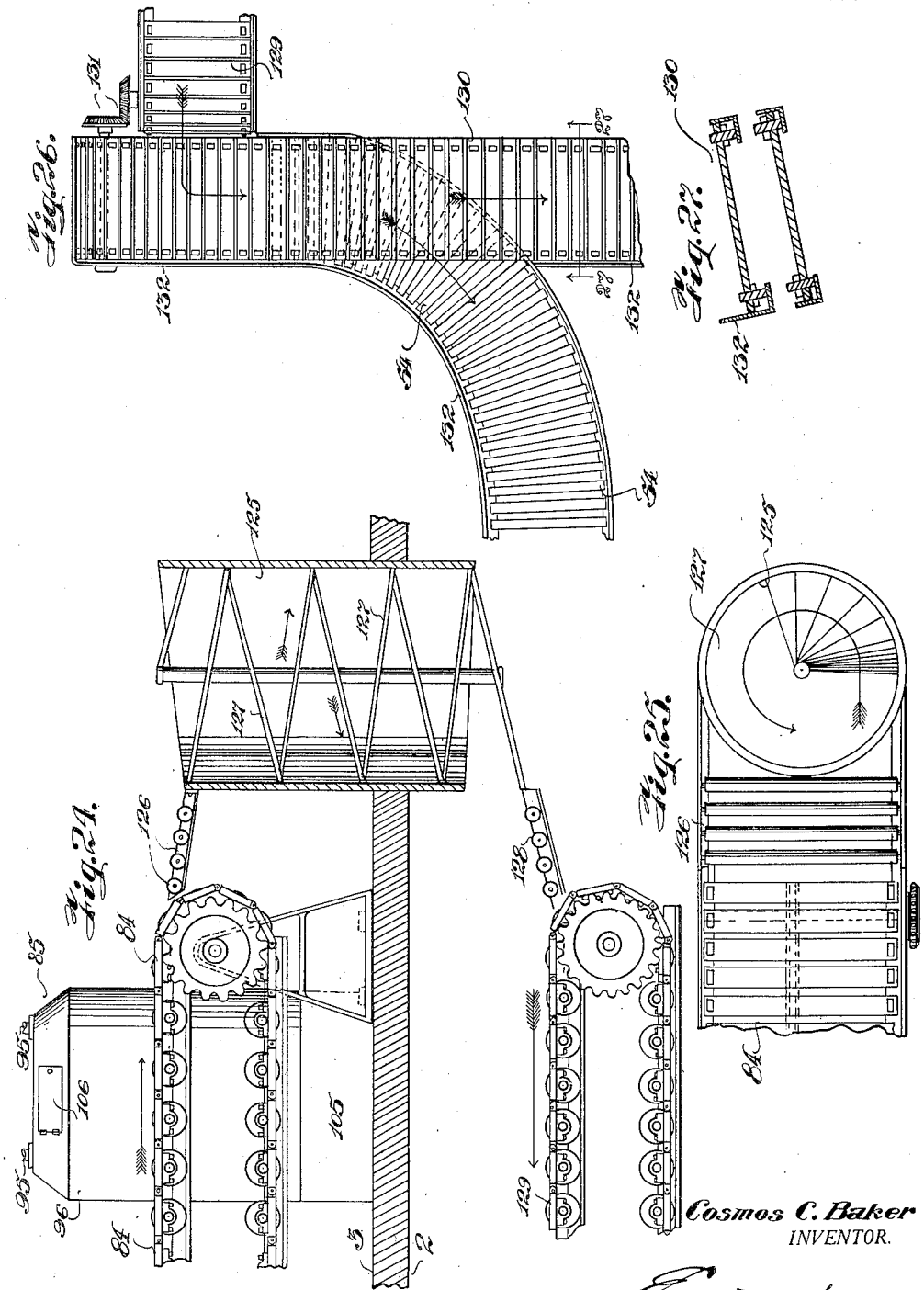

Patented June 25, 1929.

1,718,211

UNITED STATES PATENT OFFICE.

COSMOS C. BAKER, OF DALLAS, TEXAS.

SWEET-POTATO-CRISPING PROCESS.

Application filed October 4, 1927. Serial No. 224,019.

This invention relates to an apparatus and process for the production of a form of edible crisps for sweet potatoes and analogous products and it refers more particularly to the novel arrangement and construction of machine units comprising the apparatus, including the steps employed in carrying out the process, and the principal object of the invention resides in the provision of apparatus as specified for converting sweet potatoes and similar vegetable products into such form as to enable the same to be preserved for an indefinite period of time for ultimate consumption without any deteriorating effects whatsoever It is further the object of the invention to produce a food product, which, after subjection progressively to the effects of the several steps in the process, is in the form of brittle particles, which are packed in air tight cartons for distribution, to be used by the consumer for pie fillings, puddings, or even with sugar and cream, the latter providing a dish of pleasing taste due to the crispness of the product.

Other objects of the invention, which will become apparent as the description proceeds reside generally in the novel construction and arrangement of elements progressively disposed to receive and treat the product as it is passed through the entire plant, during the converting process, and in the steps of the process itself.

With the foregoing in view, reference is made especially to the drawings forming part hereof, in which;—

Figure 1 represents a plan view of the first floor of the plant, showing the relationship of the series of units in which the product is primarily received and treated, and which is taken on lines 1—1 of Figure 3.

Figure 2 is a plan view of the second floor of the plant, showing the battery of secondary baking and crisping units, receiving the product subsequent to its treatment by the primary units, taken on lines 2—2 of Figure 3.

Figure 3 is a sectional view of the plant, showing the first and second floors thereof.

Figure 4 is a fragmentary, side elevational view of the washing unit, receiving the product prior to its passage into the bake ovens.

Figure 5 is a view on lines 5—5 of Figure 4.

Figure 6 is a view of the chute and agitator by which the product is introduced into the apparatus, and shown in sectional elevation.

Figure 7 is a plan view of the agitator, fragmentarily showing the chute.

Figure 8 is a vertical sectional view of the drying unit arranged relative to the washer in a progressive manner.

Figure 9 is an end view of the drying unit.

Figure 10 represents a plan view of an assembly of three peeling tables, between which the product is conveyed.

Figure 11 is an end view on lines 11—11 of Figure 10.

Figure 12 is a side elevational view of the peeling tables, illustrating one form of power take off.

Figure 13 is a detail view, fragmentarily shown in vertical section of the endless conveyor belt construction generally used throughout the plant, on lines 13—13 of Figure 11.

Figure 14 is a detail view, partly in section, showing one of the cutters, one of which is mounted on each peeling table.

Figure 15 is a detail view of the elevator for conveying the commodity to the second floor of the plant in pans.

Figure 16 is a side elevational view of the elevator.

Figure 17 is a detail view of an eccentric for successively discharging the pans from the elevator upon reaching the desired destination on the second floor.

Figure 18 is a plan view of the elevator.

Figure 19 is an elevational view in longitudinal section of one of the mills, combining the secondary baking or crisping oven.

Figure 20 is a view on lines 20—20 of Figure 19.

Figure 21 is a plan view of one of the mills on lines 21—21 of Figure 20.

Figure 22 is a fragmentary plan view of the discharge end of the secondary oven shown in Figure 19.

Figure 23 is a fragmentary side elevational view of the conveyor belt operating in the oven shown in Figure 19.

Figure 24 is a fragmentary view of pan conveyor belts, showing the manner of transferring the pans from one belt to another in returning the pans to their original location.

Figure 25 is a plan view of the spiral return conveyor shown in Figure 24.

Figure 26 is a plan view of a lateral pan distributing belt, showing one of a series of take-off belts for uniformly distributing the pans to the respective peeling tables, and Figure 27 is a sectional view on lines 27—27 of Figure 26.

In continuing with a more detailed description of the invention, it may be stated that the drawings illustrate a preferred embodiment thereof, and Figure 3, representing the continuation of the system and operative relationship of the several units constituting from the oven, the product is cooled and connection with the following detail description, will effect the identification and comprehension of the several related views throughout the drawings.

While the plant and process is intended primarily for treating sweet potatoes in the production of crisps, other related products may be similarly processed. The potato may be introduced into the machine in its natural state, whereupon it is automatically washed with hot water and air dried and conveyed slowly through an oven. After emerging from the oven, the product is cooled and continues past a series of peeling tables where the product is placed in suitable pans to resume its passage through the plant. The pans containing the product are successively caught up by an elevator and conveyed to the second floor of the plant, while the peelings are conveyed to a point where they are deposited into a chute leading to the basement. The product, upon reaching the second floor is deposited into a series of mills, having in connection therewith, crisping ovens, wherein the product is ground and forced out through a multiplicity of restricted openings to produce shreds. The shreds progress slowly through the crisping oven, and after emerging therefrom, are subjected to a draft of cold air to complete the crisping process, and are cut into short sections and conveyed by air blasts to the packing room to be boxed for distribution.

Having thus introduced the invention as to its general operation and purpose, a detailed description of the several figures represented in the drawings, will follow, in which each part will be referred to by a separate character of reference.

The basement, first and second floors are designated by characters 1, 2 and 3 respectively, and the storage department wherein is kept the supply of potatoes is indicated at 4, in Figure 3, a general elevational view. A tray 5, extends from the storage 4 through an opening in the wall 6, as especially shown in Figure 6, to the washing unit, to be described presently. Co-operating with this tray is an agitator 7, shown expressly in Figures 6 and 7, above which is disposed a hopper 8. This agitator is arranged for limited lateral movement to uniformly distribute the potatoes upon the carrier belt for baking, as will become apparent presently. This lateral movement is provided by a disc 9, to which is eccentrically connected an arm 10, which latter is also connected to the agitator as shown at a, a shaft 11 extends through the wall 6 and receives its power of rotation from the main belt drive 12, shown in Figure 3, which rotation is imparted through beveled gears 13 and 14 to shaft 15 to rotate the disc 9. The agitator tray 7 operates upon ball bearings 16 to eliminate friction.

Potatoes having thus entered the apparatus, necessarily pass between brushes 17 and 18, included in the washing unit and which is in the washing unit and which is illustrated in detail in Figures 4 and 5. The brush 18 is in the form of an endless belt encircling preferably wooden rollers 19, the upper of which is supported upon a standard 20, and driven through a sprocket 21 mounted upon a lateral shaft 22 extending laterally across the housing 23 enclosing the washing unit. This sprocket 21 receives its power of rotation through chain 24 from sprocket 25 on belt shaft 26.

It is preferred that the potatoes be sprayed with hot water during their passage between the brushes 17 and 18 and until they emerge from the housing 23. To accomplish this, a series of pipes 27 extend laterally from a supply line 28, and have spaced thereon a series of sprays 29, directing the water upon the potatoes as they gravitate down the chute 5, and also as they pass between the brushes 17 and 18, due to the position of sprays 30, mounted upon pipes 31.

The potatoes, upon falling upon the conveyor belt 32, the specific construction of which will be later described, are conveyed slowly through the drier, which is composed of the arrangement shown in detail in Figures 8 and 9. It is understood that when the potatoes are washed in hot water, they will dry more readily than if washed in cold water, and upon passing through the oven, the heat thereof will cause the peeling to separate from the body of the potato, and cause the potato to absorb the syrup, making the same easy to peel.

The relationship of the drier with respect to the washing unit may be determined by reference to Figure 3, and its construction may be clearly understood in Figures 8 and 9. A hood 33 is provided above the belt 32 to receive and carry off through conduit 34, air injected into the drier through pipes 35, which air passes through the heating units 36 and is heated to more quickly dry the potatoes reposing on the belt 32 which is slowly moving.

With reference especially to the conveyor belt 32 and its propelling means, attention is directed to Figure 13, which shows a cross sectional view of the preferred form of belt used throughout the plant except in cases where the construction must vary to suit the conditions. This belt is composed of metal strips 37, near either end of which a link 38 is mounted to interlock the strips. These links, as shown each have integral teeth 39, which are engaged by the teeth of the sprocket wheel. On either end of each of the strips 37 is mounted a roller 40, which rolls along an angle iron track 41. The conveyor belt 32, upon which the potatoes initially fall when emerging from the washing brushes is driven from a suitable means of power from the basement through belt 42, as in Figure 3, and transmits this power to the oven belt 43, of a similar construction by the arrangement shown in Figure 8, which consists of a chain 44 surrounding sprockets 45. The potatoes thus enter the oven 45$^a$, and due to the length of the ovens, and slow rate of speed at which the belt is traveling, the potatoes are permitted to remain within the ovens a period of time sufficient to thoroughly bake them.

Beyond the point where the oven belt 43 reverses itself, a hood 46 is disposed, which is adapted to draw off the heat absorbed by the potatoes during their passage through the oven. This hood is not shown in detail but its relationship with respect to the oven may be determined by reference to Figures 1 and 3.

The oven belt 43 discharges continuously upon a similar belt 47, which latter is adapted to convey the potatoes to a series of peeling tables subsequent to the action of drafts of cold air through pipe 48 adjacent the peeling tables. It is the object in providing separate conveyors to maintain heated condition of the oven belt while the belt 47 remains cool.

Reference to Figures 10 to 14 inclusive will disclose the specific construction of the peeling tables, and their relationship to the conveyor belt 47, continuing on a straight course past, or between the tables. These tables as, apparent in Figure 10 especially, are alternately arranged on either side of the belt 47 and are composed of the work surface 49, recessed at $b$ to accommodate the operator, sitting upon the stool 50, and supported from the floor by angle iron standards 51. Upon each table is mounted an arm rest 52, also a support 53 upon which the operator places a pan, not shown, for receiving potatoes after being peeled, in which they are to continue their course through the plant. These pans are removed from the pan distributing belt 54, arranged immediately above the belt 47 for the convenience of the operators and are constructed of a series of parallel rollers, as will be described presently.

Potatoes emerging from the bake oven 45$^a$, being conveyed by belt 47 conveniently adjacent the peeling tables where they are caught up by the operators, are stripped of their peelings and dropped in suitable pans and again placed on belt 47 to continue their course through the plant. To expedite the peeling operation, a cutter is mounted upon each peeling table adjacent an opening 55 therein. See Figure 10. This cutter is illustrated in detail in Figure 14 and is composed of opposed co-operating cutter knives 56, the upper of which has connected thereto rods 57, the latter depending downward through the peeling table, and a cross-head 58 is mounted thereon. A rod 59 is connected to the cross head and depends to the floor, at which point a foot lever 60 is so mounted as to pull the rod 59 when depressed, to bring the knives 56 together. Expansile springs 61 are provided in the cutter to return the knives 56 back to normal position after being actuated. The ends of the potato are inserted between the knives and thus severed, after which the body peeling may be readily removed, and the entire peeling deposited into the opening 55 to fall down the chute 62, onto a smaller belt 63, moving in an opposite direction beneath the conveyor belt 47. In this manner the peelings are again passed slowly through the oven 45$^a$ and thoroughly baked, after which they are deposited into a chute 64 in the oven to be received in the basement 1, as in Figure 3. From these peelings, baked as they are, a very delicious beverage may be made.

In order to impart reverse movement to the peeling conveyor belt 63, an arrangement such as shown in Figure 12 is shown as an example as to how this can be accomplished. A sprocket 65, rotated by the conveyor belt 47 operates in turn a chain 66, surrounding a similar idle sprocket 67. The position of another sprocket 68 on the chain 66 permits the latter sprocket 68 to rotate in an opposite direction to sprockets 65 and 67, hence causing the peeling conveyor to move also in an opposite direction.

Returning now to the product and its continuation through the plant, reference is temporarily made to Figure 1, showing the relationship of the several assemblies of peeling tables and the common conveying belt 69 receiving the pans containing the potatoes and delivering them to the elevator 70 for transferring same to the second floor. Throughout the baking process, the product continues, as previously mentioned, on a straight course from the washing unit, through the bake ovens to the laterally arranged belt 69. When the pans containing the baked and peeled potatoes are discharged onto belt 69 however, they then travel at right angles to the rows of peeling tables and are maintained in the center of this belt by a series of deflectors, designated by the character 71 in Figure 1. It has not been considered necessary to illustrate the belt 69 in detail, since its construction does not depart from that of belts 32 and 47, and has no added features aside from the deflectors 71. This belt 69 may receive its propelling power from a suitable right angle take off, such, for example, as shown in Figure 26, to which reference will be later made.

Especially referring to the elevator and its associated elements, reference to be made to Figures 15 to 18 inclusive, in which opposed endless chains 72 are shown surrounding sprockets 73 and 74, the latter being mounted on a common shaft 75 supported by floor standards 76 on the first floor, while sprockets 73 are mounted upon a common shaft 77 supported by standards 78 mounted upon the second floor. As an example, an electric motor 79 is shown as supplying driving power for the elevator, but which may, if desirable, be driven from the lateral belt 69 on the first floor. At spaced points along the length of chains 72 are short stub shafts 80, on the ends of which are mounted rollers 81, as apparent in Figure 18 especially. These rollers ride in vertically disposed channel members 82 to steady the chains while in motion. Also, the chains 72, carry a multiplicity of horizontally protruding fingers 83, in spaced relationship, which are adapted to progressively receive and carry the pans from the belt 69 to the second floor and deposit the same upon a like belt 84, see Figures 2, 3, and 19, to be conveyed along adjacent a series of grinding mills 85, to which reference will be later made in detail.

The fingers 83, carried by chains 72 are arranged to pass upward between a series of rollers 86, forming the continuation of belt 69, suggested in Figure 15. These rollers must of necessity be supported independently from the floor by a mounting 87, so as not to interfere with the passage of the fingers 83. The momentum imparted to the pans by the motion of belt 69 throws the pans off onto the independent rollers 86, and the pans are held for reception by fingers 83 by a stop 88 at the end of the roller assembly. See Figures 15 and 16.

After being elevated to the second floor, the pans are discharged from the fingers 83 upon which they are supported, by the eccentric arrangement shown in detail in Figure 17. This arrangement consists of a flanged cam 89, mounted upon the shaft 77. A rider 90 co-operates with the flange of the cam, and has connected thereto a shaft 91, as in Figures 17 and 18, to which in turn is affixed the placer on pan engaging member 92. When the shaft 77 is rotated, the cam obviously rotates, reciprocating the shaft 91 and placer 92. This action is timed according to the position of the fingers 83 as the latter pass relative to the belt 84 relative to the mills 85, that is, when the fingers 83 reach a position to where the pan is on a level with conveyor belt 84, the placer 92 pushes the pan onto the belt 84 to permit the latter to continue on its normal course through the plant. A similar take off arrangement in the form of rollers 93, are likewise provided at the elevator discharge on the second floor, fragmentarily shown in Figures 16 and 18, upon which the pan is received from the fingers 83, prior to its reception by the belt 84.

The progress thus far is obvious from the foregoing, and by reference to Figures 2 and 19 will disclose the progress of the pans containing the baked and peeled potatoes on the second floor after discharge from the elevator. A fragmentary showing of the belt 89 and discharge end of the elevator 70 is shown in Figure 19 to show the relationship of these elements with respect to the mills 85. One operator may efficiently operate from two to five mills, and his position is between the belt 84 and the assembly of mills, in the passageway shown in Figure 2, a plan view of the second floor.

Each mill 85 is composed of a pair of spiral pressure units 94, mounted upon vertical shafts 95, operating within a housing 96. An overhead horizontal shaft 97, swung by ceiling standards 98 is provided, see Figures 3 and 19, to which the shafts 95 are geared by beveled gears 99 and 100, shown in Figure 19. This shaft 97 extends parallel with the pan conveyor belt 84. A plurality of shapers, in the form of small tubes 101 communicate with a series of apertures 102 in the plates 103 mounted in the bottom of the mill housings 96, and through these tubes the potatoes are forced after being thoroughly ground to break up the filaments common in this character of vegetable.

The positions of these shapers 101 enable the product to be uniformly distributed along the entire width of the belt 104, operating within the crisping ovens 105. Each of the mills 85 is provided with hoods in which doors 106 are arranged through which the operator inserts the potatoes, after which, he places the empty pans back on the belt 84 to be returned to their original position adjacent the peeling tables, which will be taken up presently.

Referring especially to the crisping ovens 105, it will be noted that these ovens extend laterally across the building on the second floor, at right angles to the primary baking ovens 45$^a$ on the first floor. The general plan of such relationship may be obtained from an examination of the Figures 1 and 2.

The product now having been reduced by the mills 85 to a pulpous state and forced out through the tubes 101 to form shreds, is received in continuous unbroken strings in parallel relationship on the conveyor 104 referred to. This belt, as exemplified in Figure 23, is composed of a series of strips 107, interlocked by links having teeth 108. This belt differs in construction to those 32, 47 and 69, only in the provision of concave strips 109, affixed to strips 107, upon which the shredded product is received, after emerging from the mills. The particular shape of these strips undulates the shreds, since the product is soft when received by the belt, and conforms to the surface of the strips 109.

The belt 104 is driven in the conventional manner by a sprocket wheel 110 protruding from the side of the oven 105, as in Figures 20 and 21, and conveys the product slowly through the oven. Heating units 111 are arranged within oven 105 supplying the necessary heat to thoroughly bake the shreds on the belt.

After having been subjected to the heat of the oven 105, the product finally reaches a point where the hot air is drawn up through a conduit 112, as shown in Figure 19, partially cooling the product, then, through conduit 113, a continuous blast of cold air is blown into the housing in advance of a baffle 114 in the oven, confining the heat. It is understood that after baking the product thoroughly, before the latter can be made brittle, it must be instantly subjected to cold air, whereupon the moisture brought about by heating instantly leaves the product, leaving the same in a crisp and brittle state. It will be noted that the particular angle at which the conduit 113 enters the housing in Figure 19, aids in forcing the product in its brittle state toward the conduit 115. First, however, the endless shreds are broken into short sections after crisping, by the cutter 116, its relationship with respect to the belt being shown in the detail view, Figure 23. This cutter is composed of a series of longitudinal blades 117, and is mounted upon a shaft 118. The cutter is propelled by the motion of the belt 104, the blades 117 entering between the concave strips 109 successively as they pass over the sprocket 119. It is obvious that the cutter blades 117, in so entering between the strips 109 cut the shreds into short sections for convenience in handling as well as affording a uniform product for use by the consumer. The drawing however, illustrates the strips 109 as wider than in practical use, since the commodity must of necessity be in shorter sections than would be produced by the strips of such width as shown.

Adjacent the cutter 116, is situated a brush 120 which is constantly held against the belt 104 and extends its full width. This brush is composed preferably of stiff bristles or wire to remove particles of the mass possibly adhering to the belt, consequently keeping the belt clean.

After having been discharged into the conduit 115, a constant draft of air through the latter conveys the crisps from each of the several ovens 105 to the packing room 121 and distributes them by branch conduits 122 as in Figures 2 and 3, to respective bins 123, preparatory to packing in suitable cartons for distribution. It will be noted that the conduit 115 has at spaced intervals therein vents 124 to maintain crisp condition of the product.

Returning now to the disposition of the pans after the product is deposited into the mills 85, as stated, these pans are replaced upon the belt 84 where they continue to a spiral conveyor 125, shown in vertical section in Figure 24. An inclining roller track 126 is arranged relative to the belt 84 upon which the pans are discharged when the belt 84 reverses. The momentum of the pans after leaving the belt 84 is such as to carry them about the spiral flight 127 downward to a similarly arranged roller track 128, onto another belt 129, in the direction of the arrows. Figure 24 shows the receiving end of belt 129 while Figure 26 shows the discharge end thereof. It will be noted in this latter figure that the belt 129 imparts power to a lateral distributing belt 130, a cross sectional view of which is shown in Figure 27, while in Figure 3, the relationship of this belt with the equipment on the first floor may be determined, an end view being shown therein. This belt 130 so receives its propelling power from the belt 129, as stated, through beveled gears 131 in Figure 26, and is arranged at an angle with respect to belt 129 as shown. A guard rail 132 extends along the lowest side of the belt 130 to prevent the pans from sliding off. The purpose of the angular disposition of this belt is to constrain the pans to travel on the low side thereof, whereby they may progressively enter the several take off conveyors 54 composed of a multiplicity of spaced rollers as shown, there being one of these conveyors over each peeling table as may be seen in Figure 3. This belt has been previously mentioned in the description of the peeling tables. It will be noted in Figure 26, that the take off conveyors 54 are sharply inclined near the point where they communicate with the distributor belt 130, so as to furnish sufficient momentum that the pan will travel the full length of the conveyors 54 and stop at the required position relative to the peeling tables convenient to the operators.

In reviewing the several figures in the drawings according to the foregoing description of parts, in setting forth the operation of the plant and process; a quantity of sweet potatoes are placed in the hopper 8 shown in Figure 7 which gravitates down the agitator tray 7 into chute 5, and which are uniformly distributed by the continuous shaking of the agitator tray by the eccentric arrangement shown and previously described. Entering the washing unit between brushes 17 and 18, the potatoes are thoroughly cleansed with hot water through pipes 27, 28 and 31, after which they fall upon the conveyor belt 32. It is understood that the application of hot water permits the potatoes to dry more quickly than if cleansed with cold water.

The product is then conveyed by belt 32 past the drying unit shown in detail in Figures 8 and 9 and after being thoroughly dried thereby they are discharged off of belt 32 onto oven belt 43 to travel slowly through the oven. While no definite length is required, the ovens may be approximately one hundred feet in length, and the product may be conveyed therethrough at the rate of about three feet per minute. These figures however, may be varied to suit conditions After emerging from the ovens the potatoes pass on conveyor belt 47 between the rows of peeling tables, shown in Figures 10 to 14 inclusive, where they are intercepted by operators and peeled. The product is then placed in the pans taken off pan conveyor belt 54 and placed again on belt 47 whereupon they continue to the end of the latter and discharged onto lateral belt 69 to be conveyed to elevator 70, which carries the pans containing the product upward and deposits them onto belt 84 traveling along adjacent the rows of mills 85. Operators attending these mills catch up the pans as they pass and deposit their contents into the mills to be ground, placing the pans back onto the belt 84 to continue to the spiral conveyor 125 and discharged onto belt 129 to be conveyed again to the peeling tables on conveyor 54.

The product, having been reduced to a pulp by the mills 85 and deposited upon conveyor 104 in shreds, continues through the crisping ovens 105 where it is again baked to a brittle state, augmented by drafts of cold air introduced through pipe 113, subsequent to baking. The product is then blown out into vented conduit 115 and thus conveyed to packing department 121 and deposited into respective storage bins 123 preparatory to packing.

It is obvious from the description and drawings that the product takes a straight course through the plant, and all steps throughout the process and treatment of the product on the first floor may be viewed and superintended from the walk 133 laterally extending across the plant above the primary baking ovens 45ª, and shown in Figures 1 and 3.

The finished product, after having been packed in suitable waxed cartons may be distributed and sold to the consumer for pie and pudding fillings and numerous other purposes.

Manifestly, the construction shown and described is capable of considerable modification, and such modification as is in keeping with the appended claim is also considered within the spirit of the invention.

I claim:

The hereindescribed process of producing edible crisps from sweet potatoes which consists initially in washing the potatoes in hot water to drive inward their natural juices; then in baking and cooling the product and subsequently peeling the same; then in reducing the potatoes to a pulp by grinding and in shredding the mass; then in baking the resultant shreds; then in subjecting the shredded product to drafts of cold air while still hot and in finally breaking up the shreds.

In testimony whereof I affix my signature.

COSMOS C. BAKER.